July 16, 1940.  E. J. NEARY  2,207,754
APPARATUS FOR SLICING MEATS AND OTHER FOOD PRODUCTS
Filed Dec. 31, 1938  2 Sheets-Sheet 1
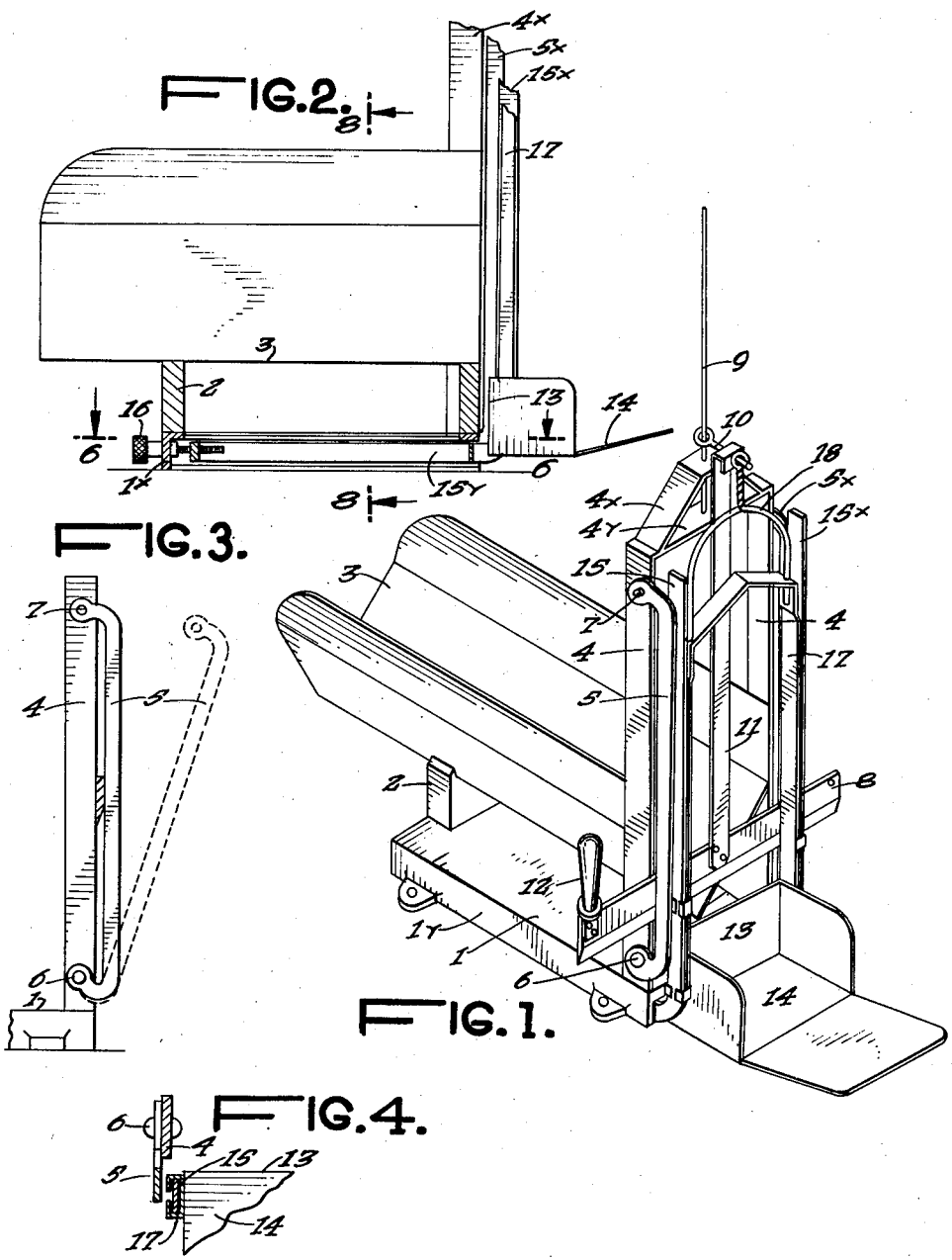
INVENTOR.
Edward J. Neary
BY
M. Lee Helms
ATTORNEY.

July 16, 1940. E. J. NEARY 2,207,754
APPARATUS FOR SLICING MEATS AND OTHER FOOD PRODUCTS
Filed Dec. 31, 1938 2 Sheets-Sheet 2
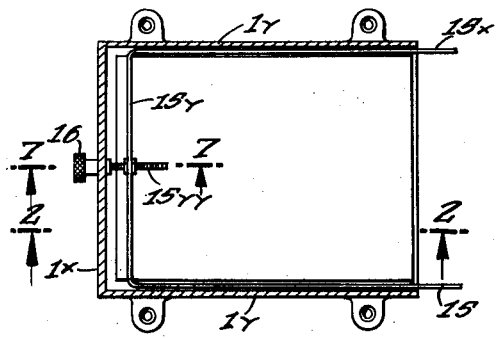
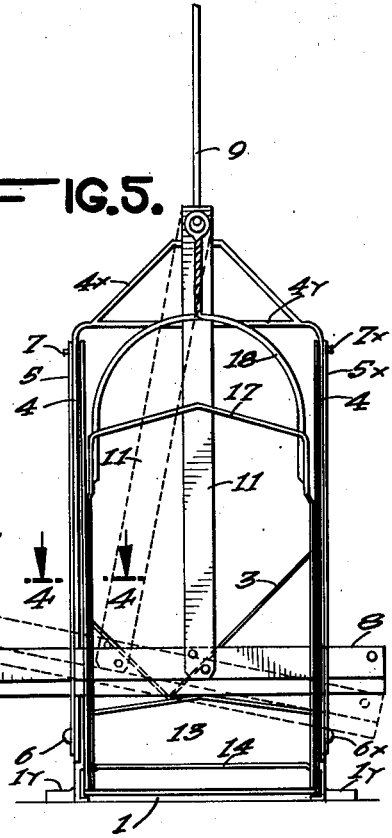
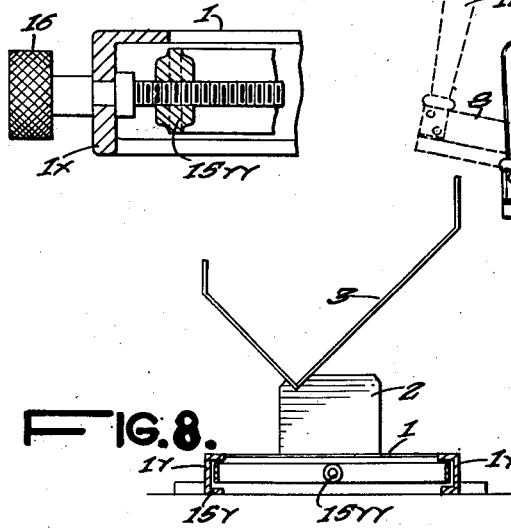
INVENTOR.
Edward J. Neary
BY
ATTORNEY.

Patented July 16, 1940

2,207,754

UNITED STATES PATENT OFFICE 2,207,754

APPARATUS FOR SLICING MEATS AND OTHER FOOD PRODUCTS

Edward J. Neary, St. John's, Newfoundland

Application December 31, 1938, Serial No. 248,717

3 Claims. (Cl. 146—150)

The object of the present invention is to provide a simplified type of slicing apparatus, a characteristic of which is that the thickness of slice is determined by adjustment of a gauge plate arranged to follow the knife in its vertical movements. Other objects and novel features of the invention will be disclosed by the description in reference to the accompanying drawings, in which:

Figure 1 is a perspective view of an embodiment of the device;

Figure 2 is a longitudinal sectional elevation on the line 2—2, Figure 6 looking in the direction of the arrows;

Figure 3 is a side elevation of one of the knife guides, the dotted line showing how the forward guide bar may be swung away from the main guide frame to permit removal of the knife;

Figure 4 is a horizontal fragmentary section on the line 4—4, Figure 5, looking in the direction of the arrows;

Figure 5 is a front elevation of the device showing in full lines the knife in bottom centre position and in dotted lines the knife in bottom position drawn towards the operator in the cutting action;

Figure 6 is a horizontal section on the line 6—6, Figure 2, looking in the direction of the arrows;

Figure 7 is an enlarged fragmentary section on the line 7—7, Figure 6;

Figure 8 is a sectional elevation on the line 8—8, Figure 2, looking in the direction of the arrows.

Referring to the drawings, the embodiment of the invention shown therein comprises a base 1 on which are mounted supports 2 to carry a V shaped container 3, upon which may rest the article to be sliced.

Secured to the base 1 in any suitable manner is the fixed guide frame 4 comprised of two uprights, which are connected at their upper ends by an A shaped frame 4x, which may be integral with the uprights 4. The crossbar 4y of the connecting member 4x, affords a seat for the fixed guide rod 9, which may be fixed in the seat in any suitable manner and which passes through a closely fitting aperture in the top of the connecting member 4x.

Slidably mounted on the rod 9 is an eyebolt 10, the shank of which passes through an arm 11 near its upper end, the arm being bent at the upper end so as to afford parallel surfaces for holding the eyebolt in horizontal position. The diameter of the eyebolt is slightly less than the diameter of the holes in the parallel surfaces of the arm so as to permit the arm to swing upon it.

Attached to the bar 11 at its lower end is a knife 8, the handle of which may be as shown in the drawings or in line with the knife in the ordinary way. The knife may be set at an angle with the line of cut by bending the bar 11 to the required shape. Such set of the knife is advisable to allow the knife to clear itself from the face from which the slice is being taken.

The knife is guided in its vertical and swinging movements by the fixed guides 4 and by movable guides 5 and 5x. Guides 5 and 5x are shown hinged at their lower ends by pivot studs 6 and 6x, and held in position at their upper ends by having holes which fit over pins fixed in the guide frame 4, as at 7, Figure 3. This, or any other suitable means may be used to permit removal of the knife from the machine.

The thickness of the slice is determined by adjustment of the gauge plate 13 relative to the line of cut. Attached to each side of the gauge plate is a frame 17 slidably mounted between upright guides 15 and 15x, which have horizontally extending parts within the base 1, and which horizontal parts are joined by a cross member 15y, has in its centre a boss 15yy threaded to admit a screw 16, which has outside the end of the base a knurled head and is held in the base by any suitable means which will permit turning of the screw, but will not permit movement of it in a lateral direction. Thus by turning the screw the arms 15 and 15x are moved towards or from the line of cut carrying with them the gauge plate 13, and by this means any desired thickness of slice may be predetermined. Attached to the upper part of the frame 17 is a hanger 18 having a hole at its upper end to receive the shank of the eyebolt 10, so that when the knife 8 is lifted or lowered the gauge plate 13 follows it in these movements.

In use the article to be sliced is placed in the V shaped container, the knife lifted until its cutting edge is above the upper surface of the article to be sliced. The article is then pushed forward until it abuts the gauge plate 13 and the knife pressed downward and worked back and forth until the slice is severed and falls upon the pan 14. It is understood that the gauge plate is set for the desired thickness of slice before the cutting operation is begun.

To sharpen the knife it may be removed from the machine and sharpened in the ordinary way.

It will be understood that various modifications of the device in its whole arrangement, or details thereof, may be made without departing from the spirit of the invention.

Having described my invention, what I claim and wish to secure by Letters Patent is as follows:

1. In a slicing apparatus a V shaped base provided with support for an article to be sliced, knife guides rising vertically from the forward end of the base, a second pair of knife guides disposed forwardly of these attached to the base and hinged to them at their lower ends and detachably fixed to them at their upper ends, a vertically extending guide rod carried by the first named knife guides, an arm having connection with the said guide rod and adapted for universal movement relative thereto, a knife connected with the arm and set by it at such an angle as will cause the said knife to clear itself from the face of the article being sliced, a gauge plate disposed forwardly of the path of the cutting edge of the knife, vertically extending guide arms for the said gauge plate, said arms having horizontal extensions in guide channels within the base, a connecting member for the extensions, and a screw device set in the rearward end of the base engaging the said connecting member for positioning it relative to the base and through it positioning the gauge plate relative to the line of cut, and means connecting said gauge plate guide arms and the arm connected with the knife whereby the gauge plate is raised and lowered with the knife.

2. A slicing apparatus constructed in accordance with claim 1 in which the means connecting the gauge plate guide arms and the arm connected with the knife comprises a yoke member carried by said guide arms, and a pivotal connection between said yoke member and the arm connected with the knife.

3. In a slicing apparatus, a support for an article to be sliced, a knife mounted for reciprocal movement, vertical guides for the knife determining the line of cut, a gauge plate disposed forwardly of the line of cut, vertically extending guide arms on which said gauge plate is slidably mounted, means of adjusting said guide arms relative to the line of cut, and connections between the gauge plate and knife whereby the tray is made to follow the knife in its vertical movements.

EDWARD J. NEARY.